United States Patent [19]

Kiss

[11] Patent Number: 4,567,227

[45] Date of Patent: Jan. 28, 1986

[54] BLEND OF WHOLLY AROMATIC POLYESTER AND POLY(ESTER-AMIDE) CAPABLE OF EXHIBITING AN ANISOTROPIC MELT PHASE

[75] Inventor: Gabor D. Kiss, Bedminster, N.J.

[73] Assignee: Celanese Corporation, New York, N.Y.

[21] Appl. No.: 670,184

[22] Filed: Nov. 13, 1984

[51] Int. Cl.$^4$ .................. C08L 67/02; C08L 77/12
[52] U.S. Cl. ............................ 524/538; 524/539; 525/425
[58] Field of Search .................. 525/425; 524/538

[56] References Cited

U.S. PATENT DOCUMENTS

| | | | |
|---|---|---|---|
| 4,228,218 | 10/1980 | Takayanagi | 525/437 |
| 4,267,289 | 5/1981 | Froix | 525/444 |
| 4,276,397 | 6/1981 | Froix | 525/448 |
| 4,386,174 | 5/1983 | Cogswell | 524/27 |
| 4,439,578 | 3/1984 | Kim | 524/538 |
| 4,460,735 | 7/1984 | Froix | 524/537 |
| 4,460,736 | 7/1984 | Froix | 524/539 |
| 4,489,190 | 12/1984 | Froix | 524/539 |

*Primary Examiner*—Wilbert J. Briggs, Sr.
*Assistant Examiner*—Patricia Short
*Attorney, Agent, or Firm*—Burns, Doane, Swecker & Mathis

[57] ABSTRACT

A polymer blend which is capable of exhibiting an anisotropic melt phase and the ability to form shaped articles having improved mechanical properties is provided. The improved polymer blend comprises approximately 5 to approximately 95 percent by weight, based upon the total weight of the polymer blend, of a melt-processable wholly aromatic polyester which is substantially free of amide linkages and approximately 5 to approximately 95 percent by weight, based upon the total weight of the blend, of a melt-processable poly(ester-amide). Each of the polymeric components apart from the blend is capable of exhibiting an anisotropic melt phase. Upon injection molding, articles formed from the improved polymer blend surprisingly exhibit at least one property selected from the group consisting of tensile strength, tensile modulus, flexural strength and flexural modulus which exceeds that of each of the polymeric components of the blend when separately injection-molded. The polymer blend of the present invention also can be used to advantage to form improved melt-extruded three-dimensional articles, etc.

55 Claims, No Drawings

BLEND OF WHOLLY AROMATIC POLYESTER AND POLY(ESTER-AMIDE) CAPABLE OF EXHIBITING AN ANISOTROPIC MELT PHASE

BACKGROUND OF THE INVENTION

When a blend or mixture is prepared from two or more ordinary, non-polymeric materials, a random distribution of the molecules of the components is obtained. This random distribution provides complete mixing without the formation of groups or clusters of the molecules of any one component. Such a mixture is expected to follow the "Rule of Mixtures." The Rule of Mixtures predicts the numerical values of properties, such as tensile and flexural strengths and tensile and flexural moduli, of a blend to be the weighted average of the numerical values of the properties of the components. A discussion of the Rule of Mixtures can be found in the book *Predicting the Properties of Mixtures: Mixture Rules in Science and Engineering*, by Lawrence E. Nielsen, Marcel Dekker, Inc. (New York: 1974).

Further information with regard to the Rule of Mixtures can be found on pages 395, 436, 465, 492, and 500 of Volume 2 of *Mechanical Properties of Polymers and Composites*, by Lawrence E. Neilsen, Marcel Dekker, Inc. (New York: 1974). As stated therein, mixtures of a polymer matrix with a fibrous reinforcing agent, a ribbon-shaped filler, or a rod-shaped filler are known to often follow the Rule of Mixtures. The above-cited referehce further discloses that mixtures of phase inverted isotropic interpenetrating polymer networks, such as a phase inverted network of polystyrene and polybutadiene, are also known to follow the Rule of Mixtures.

Mixtures of most chemically distinct polymeric materials have been found to deviate from the behavior of ordinary mixtures as characterized by the Rule of Mixtures. The sheer size of polymeric chains restricts mixing of the components and leads to the formation of domains or clusters of molecules of the individual components. Thus, it can be said that most chemically distinct polymeric materials tend to be incompatible in mixtures and exhibit a tendency to separate into phases. There often exists a boundary between the domains of the component polymers, and articles made from such a blend would be expected to exhibit failure at the boundary when placed under stress. In general, then, the mechanical properties of the product are commonly reduced rather than enhanced. Specific properties which may be thus affected include tensile strength, tensile modulus, flexural strength, flexural modulus, and impact strength.

Some polymeric materials exhibit an ordered structure in at least some regions of the polymer. This order can exist in one, two, or three dimensions. The inclusion in blends of polymeric materials exhibiting an ordered structure leads to an increased tendency of the blends to separate into phases. This is due to the fact that the order found in certain regions of the polymer causes a fairly sharp boundary between the domains of the molecules of the component polymers. Thus, blends including such polymers could be expected to exhibit a significant reduction in mechanical properties. Accordingly, there has been little impetus to form such blends, particularly for use in applications where mechanical properties are of importance.

Representative disclosures of polymer blends which may include at least one polymeric component that is capable of forming an ordered or anisotropic structure in the melt phase are found in U.S. Pat. Nos. 4,228,218; 4,267,289; 4,276,397; 4,386,174; 4,408,022; 4,451,611; 4,460,735; and 4,460,736; European patent application No. 0041327; and in commonly assigned U.S. Ser. Nos. 158,547, filed June 11, 1980, now U.S. Pat. No. 4,489,190, and 461,886, filed Jan. 28, 1983. In U.S. Pat. No. 4,386,174 at Col. 4, lines 47 to 49, poly(esteramides) capable of forming an anisotropic melt phase are identified in passing as being anisotropic melt-forming polymers which can be used to render another polymer melt-processable. Also, commonly assigned U.S. Pat. No. 4,267,289 contemplates forming a polymer blend from a pair of specifically defined wholly aromatic polyesters which are each melt-processable in the absence of the other and are each capable of forming an anisotropic melt phase.

It is an object of the present invention to provide an improved melt-processable polymer blend which is capable of forming a anisotropic melt phase.

It is an object of the present invention to provide an improved polymer blend wherein a synergism has been found to exist between the polymer blend components which leads to an ability to form shaped articles from the same that exhibit surprisingly outstanding mechanical properties It is an object of the present invention to provide an improved polymer blend which can be used to advantage to form improved molded articles, improved melt-extruded three-dimensional articles, etc.

It is an object of the present invention to provide an improved polymer blend which following injection-molding is capable of exhibiting at least one mechanical property (e.g., tensile strength, tensile modulus, flexural strength, or flexural modulus) which exceeds that of each of the polymeric components of the blend when separately injection-molded.

It is another object of the present invention to provide an improved polymer blend which is morphologically homogeneous and which has been found to possess a rheology amenable to the formation of improved shaped articles (e.g., a blend melt viscosity which is lower than that of each of the polymeric blend components).

It is a further object of the present invention to provide improved shaped articles such as improved injection-molded articles, improved melt-extruded three-dimensional articles, etc., formed from the polymer blend of the present invention.

These and other objects, as well as the scope, nature and utilization of the claimed invention, will be apparent to those skilled in the art from the following detailed description and appended claims:

SUMMARY OF THE INVENTION

It has been found that a polymer blend formed by melt-mixing which when molten is capable of exhibiting an anisotropic melt phase and which following injection-molding is capable of exhibiting at least one property selected from the group consisting of tensile strength, tensile modulus, flexural strength and flexural modulus which exceeds that of each of the polymeric components of the blend when separately injection-molded comprises:

(a) approximately 5 to approximately 95 percent by weight, based upon a total weight of components (a) and (b), of a melt-processable wholly aromatic polyester which is capable of forming an anisotropic melt phase and which is substantially free of amide linkages; and (b) approximately 5 to approximately 95 percent by weight, based upon the total weight of components (a) and (b), of a melt-processable poly(esteramide) which is capable of forming an anisotropic melt phase.

DESCRIPTION OF PREFERRED EMBODIMENTS

The first component of the polymer blend of the present invention is a melt-processable wholly aromatic polyester which is capable of forming an anisotropic melt phase and which is substantially free of amide linkages. Such polymer is melt-processable in the sense that it exhibits a melting temperature below its decomposition or degradation temperature and can be satisfactorily injection-molded or melt-extruded to form shaped articles apart from the blend of the present invention. Such polymer is wholly aromatic in the sense that each monomer which is polymerized to form the polymer backbone contributes at least one aromatic ring. In a preferred embodiment the first component of the polymer blend contains no amide linkages in the polymer backbone.

The anisotropic melt-forming wholly aromatic polyesters which can serve as the first component in the polymer blend of the present invention are known to those skilled in polymer technology. These polymers have been described by various terms including "liquid crystalline," liquid crystal," "thermotropic," "mesomorphic," "anisotropic," etc. Such polymers inherently exhibit a parallel ordering of the polymer chains when the polymer is molten even in the static state. This parallel ordering of the molten polymer chains may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under a nitrogen atmosphrere. The anisotropic character of the polymer melt is detected when the polymer melt transmits light while being examined in the static state between crossed polarizers.

As will be apparent to those skilled in polymer technology, the first component of the polymer blend commonly is prepared from monomers which are generally long, flat and fairly rigid along the long axis of the molecule and commonly have chain-extending linkages that are either coaxial or parallel. The reactive moieties which ar utilized to form the wholly aromatic polyester commonly are aromatic diols, aromatic diacids, and aromatic hydroxyacids, or their derivatives.

The aromatic rings included in the polymer chains of the first component of the polymer blend may optionally include substitution of at least some of the hydrogen atoms present upon the aromatic rings. Such substituents include alkyl groups of up to four carbon atoms, alkoxy groups of up to four carbon atoms, halogens, phenyl (including substituted phenyl), etc. Preferred halogens include fluorine, chlorine and bromine. Also, in another preferred embodiment the aromatic rings of the firs component of the polymer blend are substantially free of ring substitution.

Representative melt-processable anisotropic melt-forming wholly aromatic polyesters which may be selected to serve as the first component of the polymer blend of the present invention are disclosed in U.S. Pat. Nos. 3,991,013; 3,991,014; 4,066,620; 4,067,852; 4,075,262; 4,083,829; 4,118,372; 4,130,545; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,238,598; 4,238,599; 4,232,143; 4,232,144; 4,238,600; 4,242,496; 4,245,082; 4,247,514; 4,256,624; 4,265,802; 4,267,304; 4,269,965; 4,279,803; 4,294,955; 4,299,756; 4,318,841; 4,335,232; 4,337,190; 4,337,191; 4,347,349; 4,355,134; 4,359,569; 4,360,658; 4,370,466; 4,375,530; 4,429,100; and 4,473,682. The disclosures of each of these patents are herein incorporated by reference.

The melt-processable wholly aromatic polyester suitable for use as the first component of the polymer blend in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as the polymer particles are suspended therein. A vacuum may be applied to facilitate removal of volatiles formed during the final stage of the condensation (e.g., acetic acid or water). Alternatively, it is possible to form the wholly aromatic polyester via a slurry polymerization process with the product being suspended in a heat exchange medium such as described in U.S. Pat. No. 4,083,829.

When employing either the melt acidolysis procedure or the slurry polymerization procedure, the organic monomer reactants from which the wholly aromatic polyester is derived preferably may be initially provided in a modified form whereby the usual hydroxyl groups of the monomers are esterified (i.e., they are provided as lower acyl esters). Such lower acyl groups commonly have from about two to about four carbon atoms. Most preferably, the acetate esters of the organic monomer reactants are provided. Catalysts optionally may be employed in either the melt acidolysis procedure or in the slurry polymerization procedure such as those disclosed in the various patents heretofore incorporated by reference.

The melt-processable wholly aromatic polyester capable of forming the first component of the polymer blend tend to be substantially insoluble in common solvents and accordingly are not susceptible to solution processing. As discussed previously, they can be readily processed by common melt-processing techniques. Most suitable wholly aromatic polyesters are soluble in pentafluorophenol to a limited degree.

The melt-processable wholly aromatic polyesters commonly exhibit a weight average molecular weight of about 2,000 to 200,000, and preferably about 10,000 to 50,000, and most preferably about 20,000 to 25,000. Such molecular weight may be determined by gel permeation chromatography as well as by other standard techniques not involving the solutioning of the polymer (e.g., by end group determination via infrared spectroscopy on compression molded films). Alternatively, light scattering techniques in a pentafluorophenol solution may be employed to determine the molecular weight.

The melt-processable wholly aromatic polyester which serves as the first component of the polymer blend commonly exhibits an inherent viscosity (i.e., I.V.) of at least approximately 2.0 dl./g. (e.g., approximately 2.0 to 12.0 dl./g.) when dissolved in a concentration of 0.1 percent by weight in pentafluorophenol at 60° C.

In a preferred embodiment of the present invention the melt-processable wholly aromatic polyester is that of commonly assigned U.S. Pat. No. 4,161,470 which is herein incorporated by reference. In such embodiment the melt-processable wholly aromatic polyester consists essentially of moieties I and II which may include substitution of at least some of the hydrogen atoms present upon an aromatic ring wherein:

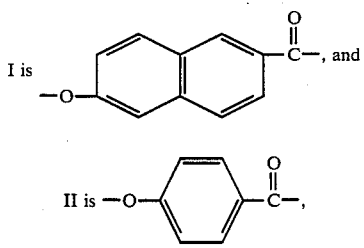

with said optional substitution if present being selected from the group consisting of an alkyl group to 1 to 4 carbon atoms, an alkoxy group of 1 to 4 carbon atoms, halogen, phenyl, and mixtures thereof, and wherein said wholly aromatic polyester comprises approximately 10 to 90 mole percent of moeity I and approximately 10 to 90 mole percent of moiety II. In a preferred embodiment the aromatic rings of the wholly aromatic polyester are substantially free of ring substitution. Also, in a preferred embodiment the wholly aromatic polyester comprises approximately 15 to 35 mole percent of moiety I and approximately 65 to 85 mole percent of moiety II. In a particularly preferred embodiment the wholly aromatic polyester consists essentially of approximately 27 mole percent of recurring 6-oxy-2-naphthoyl moieties and approximately 73 mole percent of recurring 4-oxy-benzoyl moieties.

The second component of the polymer blend of the present invention is a melt-processable poly(ester-amide) which is capable of forming an anisotropic melt phase. Such polymer also is melt-processable in the sense that it exhibits a melting temperature below its decomposition or degradation temperature and can be satisfactorily injection-molded or melt-extruded to form shaped articles apart from the blend of the present invention. Such poly(ester-amide) preferably is wholly aromatic in the sense that each monomer which is polymerized to form the polymer backbone contributes at least one aromatic ring. The anisotropic character of the melt phase can be confirmed as discussed with respect to the wholly aromatic polyester blend component.

The anisotropic melt-forming poly(ester-amides) which can serve as the second component in the polymer blend of the present invention are also known to those skilled in polymer technology. Such poly(ester-amides) are also generally prepared from monomers which are long, flat and fairly rigid along the long axis of the molecules and commonly have chain-extending linkages that are either coaxial or parallel. The reactive moieties utilized to form the poly(ester-amides) commonly are aromatic amines, aromatic diols, aromatic or cyclohexylene diacids, and aromatic hydroxyacids, or their derivatives. The aromatic rings included in the polymer chains may optionally include substitution as previously described in conjunction with the wholly aromatic polyester blend component.

Representative melt-processable anisotropic melt-forming poly(ester-amides) which may be selected to serve as the second component of the polymer blend are disclosed in U.S. Pat. Nos. 4,272,625; 4,330,457; 4,339,376; 4,341,688; 4,351,917; 4,351,918; and 4,355,132. The disclosures of each of these patents are herein incorporated by reference.

The poly(ester-amide) blend component generally may be formed by the same polymerization routes described in conjunction with the wholly aromatic polyester blend component with amine reactive monomer group (or amine derivatives) being substituted in whole or in part for hydroxyl reactive monomer groups (or their derivatives).

The melt-processable poly(ester-amides) capable of forming the second component of the polymer blend also tend to be substantially insoluble in common solvents and accordingly are not susceptible to solution processing. As discussed previously, they can be readily processed by common melt-processing techniques. Most suitable poly(ester-amides) are soluble in pentafluorophenol to a limited degree.

The melt-processable poly(ester-amides) commonly exhibit a weight average molecular weight of about 2,000 to 200,000, and preferably about 10,000 to 50,000, and most preferably about 20,000 to 25,000. Such molecular weights can be determined as described in conjunction with the wholly aromatic polyester blend component.

The melt-processable poly(ester-amide) which serves as the second component of the polymer blend commonly exhibits an inherent viscosity (i.e., I.V.) of at least approximately 2.0 dl./g. (e.g., approximately 2.0 to 12.0 dl./g.) when dissolved in a concentration of 0.1 percent by weight in pentafluorophenol at 60° C. In a particularly preferred embodiment the poly(ester-amide) blend component exhibits and inherent viscosity of approximately 3 to 6 dl./g. when examined via such I.V. determination.

In a preferred embodiment of the present invention the melt-processable poly(ester-amide) is that of commonly assigned U.S. Pat. No. 4,330,457 herein incorporated by reference. In such embodiment the melt-processable poly(ester-amide) consists essentially of moieties I, II, III, and optionally IV, wherein:

I is

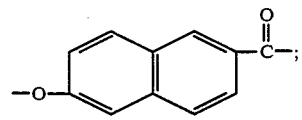

II is

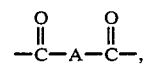

where A is a divalent radical comprising at least one aromatic ring or a divalent trans-1,4-cyclohexylene radical;

III is - Y - Ar - Z - where Ar is a divalent radical comprising at least one aromatic ring, Y is O, NH or NR, and Z is NH or NR, where R is an alkyl group of 1 to 6 carbon atoms; and IV is - O - Ar'- O - where Ar' is a divalent radical comprising at least one aromatic ring; wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. In a preferred embodiment the aromatic rings of the poly(ester-amide) are substantially free of ring substitution. Also, in a preferred embodiment the poly(ester-amide) is wholly aromatic in the sense that each monomer which is polymerized to form the polymer contributes at least one aromatic ring. Additionally, in a preferred embodiment the poly(ester-amide) comprises approximately 40 to 80 mole percent of moiety I, approximately 5 to 30 mole percent of moiety II, approximately 5 to 30 mole percent of moiety III, and approximately 0 to 40 mole percent of moiety IV. In particularly preferred embodiment the poly(ester-amide) consists essentially of approximately 60 mole percent of recurring 6-oxy-2-naphthoyl moieties, approximately 20 mole percent of recurring terephthaloyl moieties, and approximately 20 mole percent of 4-oxyaminophenylene moieties.

The polymer blend of the present invention has been found to be morphologically homogeneous in that when an exposed surface of a broken test specimen formed from the same is examined by scanning electron microscopy at a magnification of 2000X, no discrete domains of each polymeric component are apparent. Also, the polymer blend of the present invention commonly has been found to exhibit unusually low melt viscosity values. Such melt viscosity at low shear rates typically is lower than that of each of the polymeric blend components. For instance, a representative wholly aromatic polyester of U.S. Pat. No. 4,161,470 was found to exhibit a melt viscosity of approximately 4788 poise at a shear rate of 10 sec.$^{-1}$, and a representative poly(ester-amide) of U.S. Pat. No. 4,330,457 was found to exhibit a melt viscosity of approximately 5737 poise at a shear rate of 10 sec.$^{-1}$. When 70 percent by weight of the wholly aromatic polyester was melt blended with 30 percent by weight of the poly(ester-amide), the blend melt viscosity dropped to approximately 4301 poise at a shear rate of 10 sec.$^{-1}$. Additionally, when 30 percent by weight of the wholly aromatic polyester was melt blended with 70 percent by weight of the poly(ester-amide), the blend melt viscosity dropped even further to approximately 2606 poise at a shear rate of 10 sec.$^{-1}$.

The polymer blend of the present invention comprises approximately 5 to approximately 95 percent by weight of the wholly aromatic polyester and approximately 5 to 95 percent by weight of the poly(ester-amide) based upon the total weight of these components. More specifically, the polymer blend may comprise approximately 20 to approximately 80 percent by weight of the wholly aromatic polyester and approximately 20 to approximately 80 percent by weight of the poly(ester-amide) based upon the total weight of these components. In a more preferred embodiment of the present invention the polymer blend comprises approximately 25 to approximately 75 percent by weight of the wholly aromatic polyester and approximately 25 to approximately 75 percent by weight of the poly(ester-amide) based upon the total weight of these components. In a particularly preferred embodiment the polymer blend comprises approximately 30 percent by weight of the wholly aromatic polyester and approximately 70 percent by weight of the poly(ester-amide). Each of the above weight percentages for the polymeric components of the blend is exclusive of additionally added components, such as reinforcing agents, fillers, etc., which are discussed hereafter.

The polymer blend of the present invention may optionally incorporate approximately 1 to approximately 60 percent by weight (preferably approximately 10 to 30 percent by weight), based upon the total weight of the molding composition, of a solid filler and/or reinforcing agent. Representative filler materials include calcium silicate, silica, clays, talc, mica, polytetrafluoroethylene, graphite, alumina trihydrate, sodium aluminum carbonate, barium ferrite, etc. Representative reinforcing fibers include glass fibers, asbestos, graphitic carbon fibers, amorphous carbon fibers, synthetic polymeric fibers, alumina fibers, aluminum silicate fibers, aluminum oxide fibers, titanium fibers, magnesium fibers, rock wool fibers, steel fibers, tungsten fibers, cotton, wool, wood cellulose fibers, etc. The relatively low melt viscosity of the polymeric blend enables substantial concentrations of a solid filler and/or reinforcing agent to be added without raising the melt viscosity to unacceptably high levels.

The improved polymer blend of the present invention is formed by mixing the wholly aromatic polyester and poly(ester-amide) components while each is in the molten state. For instance, initially the polymeric components can be individually provided in the form of solid chips o pellets. Each of the components can be separately weighed, and then physically mixed together in an appropriate apparatus e.g., a ball mill). If a solid filler and/or reinforcing agent is to be incorporated within the polymer blend, it too can be physically admixed with the solid polymer components at this point in time. The physical admixture of the solid polymeric blend components preferably is next dried. Such drying conveniently can be conducted in a vacuum oven or in a circulating air oven, although any suitable apparatus may be used. The purpose of the drying step is to remove water from the physical mixture so as to prevent water-initiated degradation of the polymers during the melt-blending operation. After the mixture of solid polymer particles has been dried, a substantially uniform polymer melt blend can then be prepared. A convenient method for forming the polymer melt blend is by melt-extrusion. The extrusion apparatus thoroughly mixes the polymers in the melt and then extrudes the blend in the form of a strand which upon solidification can be cut or broken into chips or pellets which are suitable to form improved shaped articles. Alternatively, discrete pellets of each of the polymer blend components can be fed to the hopper of an injection-molding machine with the desired melt-blending being accomplished by the plasticating action of the screw of the injection-molding machine.

The polymer blend of the present invention commonly is capable of being melt-processed at a temperature in the range of approximately 250° C. to 400° C. In a preferred embodiment of the present invention the polymer blend is capable of being melt-processed at a temperature in the range of approximately 260° C. to 350° C. In a more preferred embodiment of the present invention, the polymer blend is capable of being melt-processed at a temperature in the range of approximately 280° C. to 330° C. In the most preferred embodiment of the present invention the polymer blend is capable of being melt-processed at temperature in the range of approximately 280° C. to 300° C.

It has been found that the polymer blend of the present invention can be used to form shaped articles which have surprisingly outstanding mechanical properties while using conventional shaped article-forming techniques. Such shaped articles can be in the configuration of improved molded articles (i.e., three-dimensional molded articles), improved melt-extruded three-dimensional articles (e.g., rods or pipes), etc.

Shaped three-dimensional articles can be formed from the polymer blend of the present invention while using injection-molding technology. For instance, a preferred molten melt blend of the present invention while at a temperature of approximately 300° C. and under a pressure of approximately 1,000 to 20,000 psi (e.g., approximately 3,000 to 10,000 psi) may be injected into a mold cavity. The mold cavity commonly is maintained at a temperature of approximately 25° to 150° C. (e.g., approximately 100° C.). The cycle time (i.e., the time between injections) for the polymer blend commonly is approximately 10 to 120 seconds.

When standard test bars are formed by injection-molding the polymer blend of the present invention and are tested, they are found to exhibit surprisingly outstanding mechanical properties. The standard test bars can possess dimensions of 0.076×0.125×3 inches (one inch gauge length) or 0.125×0.5×5 inches (two inch gaug length) and their tensile strength and tensile modulus values can be determined in accordance with the standard ASTM D638 procedure. The flexural properties of the test bars (i.e., flexural strength and flexural modulus) can be determined in accordance with the procedure of ASTM D790. Tensile strength values of at least 35,000 psi preferably are exhibited by injection-molded shaped articles of the present invention having dimensions of 0.076×0.125×3 inches. In a particularly preferred embodiment tensile strength values of at least 40,000 psi (e.g., at least 45,000 psi) are exhibited by the injection-molded shaped articles of the present invention having dimensions of 0.076×0.125×3 inches.

The improved polymer blends of the present invention following injection-molding are capable of exhibiting at least one property selected from the group consisting of tensile strength, tensile modulus, flexural strength and flexural modulus which exceeds that of each of the polymer components of the blend when separately injection molded. In progressively more preferred embodiments two, three, and all four of such properties of the blend exceed those of each of the polymeric components of the blend when separately injection molded.

Improved melt-extruded three-dimensional articles, such a rods, conveniently can be formed from the polymer blend of the present invention while using standard melt-extrusion technology. For instance, a preferred melt blend of the present invention while at a temperature of approximately 300° C. and under a pressure of approximately 100 to 200 psi (e.g., approximately 150 psi) may be extruded through a circular die having a diameter of 0.125 inch, quenched in water at a temperature of 25° C., and taken-up at a rate of approximately 15 to 30 feet per minute.

The physical properties of shaped articles (i.e., three-dimensional articles, etc.) formed from the polymer blend of the present invention commonly can be enhanced by subjecting the same to a heat treatment in a non-oxidizing atmosphere, such as that described in U.S. Pat. Nos. 3,975,489; 4,189,895; and 4,247,514; which are herein incorporated by reference. In a preferred embodiment the shaped articles are heated in a flowing non-oxidizing atmosphere at a temperature which is approximately 10° C. to 30° C. below the melting temperature of the polymer blend. Satisfactory residence times for such heat treatment commonly range from approximately 0.5 to approximately 24 hours, or more.

The following examples are presented as specific illustrations of the claimed invention. It should be understood, however, that the invention is not limited to the specific details set forth in the examples.

EXAMPLE I

A series of five polymer blends (i.e., Blends A through E) were prepared which differed in the relative concentrations of the wholly aromatic polyester and poly(ester-amide) blend components. Standard injection-molded test bars were prepared for each of these blends, as were similarly prepared test bars consisting solely of each of the polymer blend components.

The wholly aromatic polyester blend component was prepared in accordance with the teachings of commonly assigned U.S. Pat. No. 4,161,470, and consisted of 27 mole percent of recurring 6-oxy-2-naphthoyl moieties, and 73 mole percent of recurring 4-oxybenzoyl moieties. The wholly aromatic polyester was free of aromatic ring substitution, melted when heated to approximately 280° C., exhibited an anisotropic melt phase, was melt-processable above its melting temperature, and exhibited an inherent viscosity of approximately 8 dl./g. when dissolved in a concentration of 0.1 percent by weight in pentafluorophenol at 60° C.

The poly(ester-amide) blend component was prepared in accordance with the teachings of commonly assigned U.S. Pat. No. 4,330,457, and consisted of 60 mole percent of recurring 6-oxy-2-naphthoyl moieties, approximately 20 mole percent of recurring terephthaloyl moieties, and approximately 20 mole percent of 4-oxyaminophenylene moieties. The poly(ester-amide) was wholly aromatic as described herein, was free of aromatic ring substitution, melted when heated to approximately 285° C., exhibited an anisotropic melt phase, was melt-processable above its melting temperature, and exhibited an inherent viscosity of approximately 4 dl./g. when dissolved in a concentration of 0.1 percent by weight in pentafluorophenol at 60° C.

The five polymer blends (i.e., Blends A through E) were prepared by melt-blending in a single screw extruder, and were subsequently pelletized. The relative concentrations of each blend component within the polymer blends were as follows:

| Blend Identification | Wholly Aromatic Polyester (percent by weight) | Wholly Aromatic Poly(ester-amide) (percent by weight) |
| --- | --- | --- |
| A | 10 | 90 |
| B | 30 | 70 |
| C | 50 | 50 |
| D | 70 | 30 |

| Blend Identification | Wholly Aromatic Polyester (percent by weight) | Wholly Aromatic Poly(ester-amide) (percent by weight) |
| --- | --- | --- |
| E | 90 | 10 |

The resulting polymeric blends melted at a temperature in the range of approximately 280° to 290° C., and exhibited an anisotropic melt phase.

A number of standard test bars were prepared by injection-molding each polymer blend using an Arburg moldingmachine. Also, standard test bars similarly were prepared which were composed solely of each of the polymeric blend components. The standard test bars used in this Example had a gauge length of one inch, measured 0.076×0.125×3 inches, and were prepared by injecting the molten polymer blend while at a temperature of 300° C. and under a pressure of 4800 psi into molds provided at 100° C. while employing a 33 second cycle time.

The tensile properties of the test bars (i.e., tensile strength, elongation, and tensile modulus) were determined in accordance with the procedure of ASTM D638. The flexural properties of the test bars (i.e., flexural strength and flexural modulus) were determined in accordance with the procedure of ASTM D790. The average test results (i.e., an average for 5 bars) are presented below:

| Sample Identification | Tensile Strength (psi) | Elongation (percent) | Tensile Modulus (psi) | Flexural Strength (psi) | Flexural Modulus (psi) |
| --- | --- | --- | --- | --- | --- |
| All Wholly Aromatic Poly(ester-amide) | 34,343 | 1.6 | 3,265,280 | 32,394 | 2,115,310 |
| Blend A | 38,743 | 1.7 | 3,536,110 | 32,694 | 2,131,940 |
| Blend B | 50,988 | 2.3 | 3,470,070 | 36,710 | 2,607,540 |
| Blend C | 46,051 | 2.4 | 3,108,310 | 35,237 | 2,400,520 |
| Blend D | 36,572 | 3.3 | 2,360,460 | 25,074 | 1,531,160 |
| Blend E | 33,445 | 3.6 | 2,092,530 | 22,133 | 1,269,300 |
| All Wholly Aromatic Polyester | 33,311 | 3.6 | 2,034,580 | 20,406 | 1,167,960 |

The surprisingly good mechanical properties exhibited when the blend of the present invention is injection-molded are apparent from the foregoing data. More specifically, for Blends A through D one or more properties selected from the group consisting of tensile strength, tensile modulus, flexural strength, and flexural modulus exceeded those exhibited by each of the components of the polymeric blend when separately injection-molded.

EXAMPLE II

Example I was substantially repeated with the exception that the standard test bars formed had a gauge length of two inches, and were of a larger configuration which measured 0.125×0.5×5 inches. Such test bars together with appropriate controls were formed using a Windsor molding-machine and in some instances incorporated chopped glass fibers as reinforcement (as described).

| Sample Identification | Wholly Aromatic Polyester (parts by weight) | Wholly Aromatic Poly(ester-amide) (parts by weight) | Chopped Glass Fibers (parts by weight) |
| --- | --- | --- | --- |
| F | 100 | 0 | 0 |
| Blend G | 30 | 70 | 0 |
| H | 0 | 100 | 0 |
| I | 100 | 0 | 30 |
| Blend J | 30 | 70 | 30 |
| K | 0 | 100 | 30 |
| L | 100 | 0 | 50 |
| Blend M | 30 | 70 | 50 |
| N | 0 | 100 | 50 |

The tensile properties of the test bars (i.e., tensile strength, elongation, and tensile modulus) were determined in accordance with the procedure of ASTM D638. The flexural properties of the test bars (i.e., flexural strength and flexural modulus) were determined in accordance with the procedure of ASTM D790. The average test results (i.e. an average of 5 bars) are presented below:

| Sample Identification | Tensile Strength (psi) | Elongation (percent) | Tensile Modulus (psi) | Flexural Strength (psi) | Flexural Modulus (psi) |
| --- | --- | --- | --- | --- | --- |
| F | 24,500 | 4.0 | 1,390,000 | 22,200 | 1,310,000 |
| Blend G | 37,300 | 1.5 | 3,130,000 | 37,200 | 2,570,000 |
| H | 27,300 | 1.3 | 2,790,000 | 35,600 | 2,220,000 |
| I | 28,800 | 2.2 | 2,390,000 | 35,900 | 2,000,000 |
| Blend J | 37,300 | 1.4 | 3,830,000 | 46,300 | 3,110,000 |
| K | 33,400 | 1.2 | 3,500,000 | 43,800 | 3,390,000 |
| L | 26,600 | 1.2 | 3,400,000 | 34,600 | 2,730,000 |
| Blend M | 33,400 | 1.1 | 4,100,000 | 41,900 | 3,610,000 |
| N | 25,600 | 0.8 | 3,640,000 | 39,300 | 3,390,000 |

The surprisingly good mechanical properties exhibited when a glass filled blend of the present invention is injection-molded are apparent from the foregoing data. More specifically, for Blends G, J, and M at least three of the properties selected from the group consisting of tensile strength, tensile modulus, flexural strength, and flexural modulus exceeded those exhibited by each of components of the polymer blend when separately injection-molded. Such result was obtained in Blends J and M even in the presence of glass fiber reinforcement.

EXAMPLE III

A polymer blend substantially similar that Blend B of Example I was selected for melt-extrusion to form an elongated circular rod. The polymer blend consisted of 30 percent by weight of the wholly aromatic polyester and 70 percent by weight of the poly(ester-amide).

While at a temperature of 280° C., the molten polymer blend of the present invention was melt-extruded while under a pressure of 150 psi through a circular die having a diameter of 0.125 inch. Following extrusion the resulting extrudate was quenched in a water bath provided at 25° C. and was taken-up at a rate of 20 feet per minute. The resulting circular rod had a diameter of 0.075 inch and was tested to determine its tensile modulus. It was found that an average tensile modulus of 7,700,000 psi was exhibited.

For comparative purpose this Example was repeated with the exception that each of the polymeric blend components were similarly melt-extruded and the resulting rod products were evaluated. It was found that the resulting circular rod formed from the wholly aromatic polyester exhibited an average tensile modulus of 3,000,000 psi and the resulting rod formed from the poly(ester-amide) exhibited an average tensile modulus of 6,000,000 psi.

Although the invention has been described with preferred embodiments, it is to be understood that variations and modifications may be employed without departing from the concept of the invention as defined in the following claims.

I claim:

1. A polymer blend formed by melt-mixing which when molten is capable of exhibiting an anisotropic melt phase and which following injection-molding is capable of exhibiting at least one property selected from the group consisting of tensile strength, tensile modulus, flexural strength, and flexural modulus, which exceeds that of each of the polymeric components of the blend when separately injection-molded comprising:
   (a) approximately 5 to approximately 95 percent by weight, based upon the total weight of components (a) and (b), of a melt-processable wholly aromatic polyester which is capable of forming an anisotropic melt phase and which is substantially free of amide linkages; and
   (b) approximately 5 to approximately 95 percent by weight, based upon the total weight of components (a) and (b), of a melt-processable poly(ester-amide) which is capable of forming an anisotropic melt phase.

2. A polymer blend according to claim 1 which is capable of being melt-processed at a temperature in the range of approximately 250° C. to 400° C.

3. A polymer blend according to claim 1 which is capable of being melt-processed at a temperature in the range of approximately 260° C. to 350° C.

4. A polymer blend according to claim 1 which is capable of being melt-processed at a temperature in the range of approximately 280° C. to 330° C.

5. A polymer blend according to claim 1 which following injection-molding is capable of exhibiting at least two properties selected from the group consisting of tensile strength, tensile modulus, flexural strength, and flexural modulus which exceed those of each of the polymeric components of the blend when separately injection-molded.

6. A polymer blend according to claim 1 which following injection-molding is capable of exhibiting a least three properties selected from the group consisting of tensile strength, tensile modulus, flexural strength, and flexural modulus which exceed those of each of the polymeric components of the blend when separately injection-molded.

7. A polymer blend according to claim 1 which following injection-molding is capable of exhibiting a tensile strength, tensile modulus, flexural strength, and flexural modulus which exceed those of each of the polymeric components of the blend when separately injection molded.

8. A polymer blend according to claim 1 wherein polymer components (a) and (b) each exhibit an inherent viscosity of at least 2.0 dl./g. when dissolved in a concentration of 0.1 percent by weight in pentafluorophenol at 60° C.

9. A polymer blend according to claim 1 which comprises approximately 20 to approximately 80 percent by weight of component (a), based upon the total weight of components (a) and (b), and approximately 20 to approximately 80 percent by weight of component (b), based upon the total weight of components (a) and (b).

10. A polymer blend according to claim 1 which comprises approximately 25 to approximately 75 percent by weight of component (a), based upon the total weight of components (a) and (b), and approximately 25 to approximately 75 percent by weight of component (b) based upon the total weight of components (a) and (b).

11. A polymer blend according to claim 1 which comprises approximately 30 percent by weight of component (a), based upon the total weight of components (a) and (b), and approximately 70 percent by weight of component (b), based upon the total weight of components (a) and (b).

12. A polymer blend according to claim 1 wherein component (a) is a melt-processable wholly aromatic polyester and consists essentially of moieties I and II which may include substitution of at least some of the hydrogen atoms present upon an aromatic ring wherein:

I is 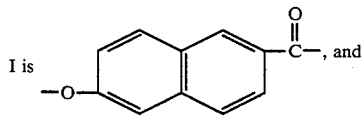, and

II is 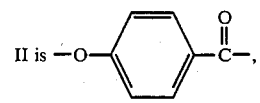, with said optional substitution if present being selected from the group consisting of an alkyl group to 1 to 4 carbon atoms, an alkoxy group of 1 to 4 carbon atoms, halogen, phenyl, and mixtures thereof, and wherein said wholly aromatic polyester comprises approximately 10 to 90 mole percent of moiety I and approximately 10 to 90 mole percent of moiety II.

13. A polymer blend according to claim 1 wherein component (b) is a melt-processable poly(ester-amide) and consists essentially of moieties I, II, III, and optionally IV, wherein:

I is

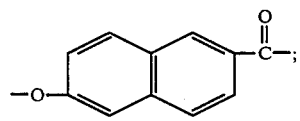

II is

where A is a divalent radical comprising at least one aromatic ring or a divalent trans-1,4-cyclohexylene radical;

III is - Y - Ar - Z - where Ar is a divalent radical comprising at least one aromatic ring, Y is O, NH or NR, and Z is NH or NR, where R is an alkyl group of 1 to 6 carbon atoms; and IV is - O - Ar'- O - where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

14. A polymer blend according to claim 1 wherein the aromatic rings of the polymeric components are substantially free of ring substitution.

15. A polymer blend according to claim 1 which following injection-molding is capable of exhibiting a tensile strength of at least 35,000 psi.

16. A polymer blend according to claim 1 which following injection-molding is capable of exhibiting a tensile strength of at least 40,000 psi.

17. A polymer blend according to claim 1 which following injection-molding is capable of exhibiting a tensile strength of at leat 45,000 psi.

18. A molding compound comprising the polymer blend of claim 1 which incorporates approximately 1 to approximately 60 percent by weight, based upon the total weight of the molding compound, of a material selected from the group consisting of solid filler, reinforcing agent, and mixtures thereof.

19. A molded article comprising the polymer blend of claim 1.

20. A melt-extruded three-dimensional article comprising the polymer blend of claim 1.

21. A shaped article comprising the polymer blend of claim 1 which has been subjected to heat treatment in a non-oxidizing atmosphere at approximately 10° C. to 30° C. below the melting temperature of the blend.

22. A polymer blend formed by melt-mixing which when molten is capable of exhibiting an anisotropic melt phase and which following injection-molding is capable of exhibiting at least one property selected from the group consisting of tensile strength, tensile modulus, flexural strength, and flexural modulus which exceeds that of each of the polymeric components of the blend when separately injection molded comprising:

(a) approximately 5 to approximately 95 percent by weight, based upon the total weight of components (a) and (b), of a melt-processable wholly aromatic polyester which is capable of forming an anisotropic melt phase and which is substantially free of amide linkages and which consists essentially of moieties I and II which may include substitution of at least some of the hydrogen atoms present upon an aromatic ring wherein:

I is 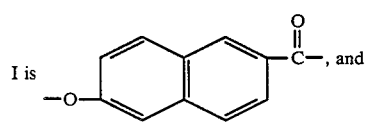, and

II is 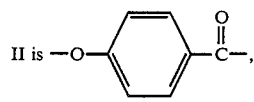, with said optional substitution if present being selected from the group consisting of an alkyl group of 1 to 4 carbon atoms, an alkoxy group of 1 to 4 carbon atoms, hydrogen, phenyl, and mixtures thereof, wherein said melt-processable wholly aromatic polyester comprises approximately 10 to 90 mole percent of moiety I and approximately 10 to 90 mole percent of moiety II, and (b) approximately 5 to approximately 95 percent by weight, based upon the total weight of components (a) and (b), of a melt-processable poly(ester-amide) which is capable of forming an anisotropic melt phase which consists essentially of moieties I, II, III, and optionally, IV wherein:

I is

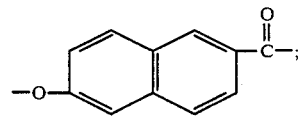

II is

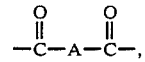

where A is a divalent radical comprising at least one aromatic ring or a divalent trans-1,4-cyclohexylene radical;

III is - Y - Ar - Z - where Ar is a divalent radical comprising at least one aromatic ring, Y is O, NH or NR and Z is NH or NR, where R is an alkyl group of 1 to 6 carbon atoms; and IV is - O - Ar'- O - where Ar' is a divalent radical comprising at least one aromatic ring;

wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV.

23. A polymer blend according to claim 22 which is capable of being melt-processed at a temperature in the range of approximately 250° C. to 400° C.

24. A polymer blend according to claim 22 which is capable of being melt-processed at a temperature in the range of approximately 260° C. to 350° C.

25. A polymer blend according to claim 22 which is capable of being melt-processed at a temperature in the range of approximately 280° C. to 330° C.

26. A polymer blend according to claim 22 which following injection-molding is capable of exhibiting at least two properties selected from the group consisting of tensile strength, tensile modulus, flexural strength, and flexural modulus which exceed those of each of the polymeric components of the blend when separately injection-molded.

27. A polymer blend according to claim 22 which following injection-molding is capable of exhibiting at least three properties selected from the group consisting of tensile strength, tensile modulus, flexural strength, and flexural modulus which exceed those of each of the polymeric components of the blend when separately injection-molded.

28. A polymer blend according to claim 22 which following injection-molding is capable of exhibiting a tensile strength, tensile modulus, flexural strength, and flexural modulus which exceed those of each of the polymeric components of the blend when separately injection-molded.

29. A polymer blend according to claim 22 wherein polymer components (a) and (b) each exhibit an inherent viscosity of at least 2.0 dl./g. when dissolved in a concentration of 0.1 percent by weight in pentafluorophenol at 60° C.

30. A polymer blend according to claim 22 which comprises approximately 20 to approximately 80 percent by weight of component (a), based upon the total weight of components (a) and (b), and approximately 20 to approximately 80 percent by weight of component (b), based upon the total weight of components (a) and (b).

31. A polymer blend according to claim 22 which comprises approximately 25 to approximately 75 percen by weight of component (a), based upon the total weight of components (a) and (b), and approximately 25 to approximately 75 percent by weight of component (b), based upon the total weight of components (a) and (b).

32. A polymer blend according to claim 22 which comprises approximately 30 percent by weight of component (a), based upon the total weight of components (a) and (b), and approximately 70 percent by weight of component (b), based upon the total weight of components (a) and (b).

33. A polymer blend according to claim 22 wherein component (a) comprises approximately 15 to 35 mole percent of moiety I and approximately 65 to 85 mole percent of moiety II.

34. A polymer blend according to claim 22 wherein component (b) comprises approximately 40 to 60 mole percent of moiety I, approximately 20 to 30 mole percent of moiety II, approximately 5 to 30 mole percent of moiety III, and approximately 0 to 15 mole percent of moiety IV.

35. A polymer blend according to claim 22 wherein the aromatic rings of the polymer components are substantially free of ring substitution.

36. A polymer blend according to claim 22 which following injection-molding is capable of exhibiting a tensile strength of at least 35,000 psi.

37. A polymer blend according to claim 22 which following injection-molding is capable of exhibiting a tensile strength of at least 40,000 psi.

38. A polymer blend according to claim 22 which following injection-molding is capable of exhibiting a tensile strength of at least 45,000 psi.

39. A molding compound comprising the polymer blend of claim 22 which incorporates approximately 1 to approximately 60 percent by weight, based upon the total weight of the molding compound, of a material selected from the group consisting of solid filler, reinforcing agent, and mixtures thereof.

40. A molded article comprising the polymer blend of claim 22.

41. A melt-extruded three-dimensional article comprising the polymer blend of claim 22.

42. A shaped article comprising the polymer blend of claim 22 which has been subjected to heat treatment in a non-oxidizing atmosphere at approximately 10° C. to 30° C. below the melting temperature of the polymer blend.

43. A polymer blend which is capable of being melt-processed at a temperature in the range of approximately 280° C. to 330° C. formed by melt-mixing which when molten is capable of exhibiting an anisotropic melt phase and which following injection-molding is capable of exhibiting at least one property selected from the group consisting of tensile strength, tensile modulus, flexural strength, and flexural modulus which exceeds that of each of the polymeric components of the blend when separately injection-molded comprising:
(a) approximately 25 to approximately 75 percent by weight, based upon the total weight of components (a) and (b), of a melt-processable wholly aromatic polyester which is capable of forming an anisotropic melt phase and which is substantially free of amide linkages and which consists essentially of approximately 27 mole percent of recurring 6-oxy-2-naphthoyl moieties and approximately 73 mole percent of recurring 4-oxybenzoyl moieties; and
(b) approximately 25 to approximately 75 percent by weight, based upon the total weight of components (a) and (b), of a melt-processable poly(ester-amide) which is capable of forming an anisotropic melt phase and which consists essentially of approximately 60 mole percent of recurring 6-oxy-2-naphthoyl moieties, approximately 20 mole percent of recurring terephthaloyl moieties, and approximately 20 mole percent of recurring 4-oxyaminophenylene moieties.

44. A polymer blend according to claim 43 which following injection-molding is capable of exhibiting at least two properties selected from the group consisting of tensile strength, tensile modulus, flexural strength, and flexural modulus which exceed those of each of the polymeric components of the blend when separately injection-molded.

45. A polymer blend according to claim 43 which following injection-molding is capable of exhibiting at least three properties selected from the group consisting of tensile strength, tensile modulus, flexural strength, and flexural modulus which exceed those of each of the polymeric components of the blend when separately injection-molded.

46. A polymer blend according to claim 43 which following injection-molding is capable of exhibiting a tensile strength, tensile modulus, flexural strength, and flexural modulus which exceed those of each of the polymeric components of the blend when separately injection-molded 47. A polymer blend according to claim 43 wherein polymer components (a) and (b) each exhibit an inherent viscosity in the range of approximately 2.0 to 12.0 dl./g. when dissolved in a concentration of 0.1 percent by weight in pentafluorophenol at 60° C.

48. A polymer blend according to claim 43 which comprises approximately 30 percent by weight of component (a), based upon the total weight of components (a) and (b), and approximately 70 percent by weight of component (b), based upon the total weight of components (a) and (b).

49. A polymer blend according to claim 43 which following injection-molding is capable of exhibiting a tensile strength of at least 35,000 psi.

50. A polymer blend according to claim 41 which following injection-molding is capable of exhibiting a tensile strength of at least 40,000 psi.

51. A polymer blend according to claim 43 which following injection-molding is capable of exhibiting a tensile strength of at least 45,000 psi.

52. A molding compound comprising the polymer blend of claim 43 which incorporates approximately 1 to approximately 60 percent by weight, based upon the total weight of the molding compound, of a material selected from the group consisting of solid filler, reinforcing agent, and mixtures thereof.

53. A molded article comprising the polymer blend of claim 43.

54. A melt-extruded three-dimensional article comprising the polymer blend of claim 43.

55. A shaped article comprising the polymer blend of claim 43 which has been subjected to heat treatment in a non-oxidizing atmosphere at approximately 10° C. to 30° C. below the melting temperature of the polymer blend.

* * * * *